(12) United States Patent
Sugaya

(10) Patent No.: US 7,313,153 B2
(45) Date of Patent: Dec. 25, 2007

(54) WIRELESS COMMUNICATION SYSTEM, WIRELESS COMMUNICATION CONTROL APPARATUS, WIRELESS COMMUNICATION CONTROL METHOD, WIRELESS COMMUNICATION APPARATUS, WIRELESS COMMUNICATION METHOD, AND STORAGE MEDIUM

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 1098 days.

(21) Appl. No.: 10/209,995

(22) Filed: Aug. 1, 2002

(65) Prior Publication Data

US 2003/0031146 A1 Feb. 13, 2003

(30) Foreign Application Priority Data

Aug. 8, 2001 (JP) ............................ P2001-240623

(51) Int. Cl.
*H04J 3/16* (2006.01)
*H04J 3/22* (2006.01)

(52) U.S. Cl. ...................... 370/468; 370/335; 370/336; 370/431; 370/329; 370/498

(58) Field of Classification Search ................ 330/329, 330/338, 336, 335, 435, 442, 330, 347, 350, 330/431, 441, 449–463, 468, 498
See application file for complete search history.

(56) References Cited

U.S. PATENT DOCUMENTS

| | | | | |
|---|---|---|---|---|
| 5,926,501 A * | 7/1999 | Souissi et al. | ............... | 375/131 |
| 6,324,184 B1 * | 11/2001 | Hou et al. | .................. | 370/468 |
| 6,542,481 B2 * | 4/2003 | Foore et al. | ................. | 370/329 |
| 6,594,246 B1 * | 7/2003 | Jorgensen | ................... | 370/338 |
| 6,628,629 B1 * | 9/2003 | Jorgensen | ................... | 370/322 |
| 7,042,905 B1 * | 5/2006 | Johnson | ..................... | 370/468 |
| 7,110,380 B2 * | 9/2006 | Shvodian | ..................... | 370/336 |

FOREIGN PATENT DOCUMENTS

| | | |
|---|---|---|
| JP | 10-178451 | 6/1998 |
| JP | 2000-244527 | 9/2000 |

\* cited by examiner

*Primary Examiner*—Edan Orgad
*Assistant Examiner*—Chuong Ho
(74) *Attorney, Agent, or Firm*—Lerner, David, Littenberg, Krumholz & Mentlik, LLP

(57) ABSTRACT

A wireless communication system allocates a channel in each frame period in which the amount of channel space allocated to each guaranteed time slot remains unchanged when transmission using an allocated channel is performed in a personal area network. For transmission in such a case, a channel is allocated at a specific position in each frame period. Even if each wireless communication apparatus cannot obtain channel allocation information transmitted from a control station, each wireless communication apparatus can detect the start position and the end position of a fixedly-allocated guaranteed time slot.

4 Claims, 9 Drawing Sheets

WIRELESS COMMUNICATION SYSTEM, WIRELESS COMMUNICATION CONTROL APPARATUS, WIRELESS COMMUNICATION CONTROL METHOD, WIRELESS COMMUNICATION APPARATUS, WIRELESS COMMUNICATION METHOD, AND STORAGE MEDIUM

BACKGROUND OF THE INVENTION

1. Field of the Invention

The present invention relates to wireless communication systems, such as a wireless LAN (Local Area Network), in which a plurality of wireless stations wirelessly communicate with one another, to wireless communication control apparatuses and methods, to wireless communication apparatuses and methods, and to storage media. More particularly, the present invention relates to a wireless communication system for allocating a transmission channel used by each wireless communication apparatus in each transmission frame defined by a beacon signal transmitted by a coordinator (wireless control station), to a wireless communication control apparatus and method, to a wireless communication apparatus and method, and to a storage medium.

More specifically, the present invention relates to a wireless communication system for allocating a transmission channel in a transmission frame by each wireless communication apparatus making a channel allocation request to the coordinator, to a wireless communication control apparatus and method, to a wireless communication apparatus and method, and to a storage medium. More particularly, the present invention relates to a wireless communication system for allocating a transmission channel in accordance with characteristics of information to be transmitted when a channel allocation request is made, to a wireless communication control apparatus and method, to a wireless communication apparatus and method, and to a storage medium.

2. Description of the Related Art

As the functions of computers have become more sophisticated, multiple computers are interconnected to form a LAN. Accordingly, information such as files and data can be shared, peripheral devices such as printers can be shared, and information can be exchanged by forwarding email and data.

In known LANs, computers are interconnected by wires using optical fibers, coaxial cables, or twisted pair cables. It is necessary to perform construction work to establish a connection in a wired LAN. As a result, LANs cannot be created easily, and cables become bothersome. After a LAN is created, the range in which each apparatus can move is limited by the cable length, which is inconvenient.

Wireless LANs have been attracting public attention as systems for liberating users from known wired LANs. In these wireless LANs, most cables can be omitted in a workspace such as in an office. Terminals such as personal computers (PCs) can be moved in a relatively easy manner.

Currently, the standardization of personal area networks (PAN) has been under consideration to form a small wireless network among a plurality of electronic apparatuses for personal use so that they can communication with one another.

For example, high-speed data transmission exceeding 20 Mbps is to be standardized as the IEEE 802.15.3 standard.

In IEEE 802.15.3, a plurality of wireless communication apparatuses is used to form a wireless personal area network. In order that the wireless communication apparatuses can transmit predetermined information to each another, a transmission channel, that is, a time slot, is dynamically allocated and transmission is performed.

In this type of wireless personal network, one wireless communication apparatus operates as a control station, referred to as a "coordinator". A personal area network is formed within a range of 10 m from the coordinator.

The coordinator transmits a beacon signal at predetermined intervals, referred to as the beacon period. This beacon period is defined as a transmission frame. The transmission frame may be constant or variable from one frame to another. A time slot to be used by each wireless communication apparatus is allocated in each transmission frame.

As methods for allocating a time slot, for example, the method referred to as a "guaranteed time slot" and the method referred to as "dynamic TDMA (Time Division Multiple Access)" are employed. A predetermined transmission capacity is guaranteed, and a transmission channel is dynamically allocated.

In channel allocation methods assumed in known personal area networks, an available channel to be allocated to each wireless communication apparatus is allowed to change in each transmission frame.

Unless a wireless communication apparatus receives a beacon signal transmitted from the coordinator at the beginning of a transmission frame, the wireless communication apparatus cannot obtain channel allocation information in that transmission frame and thus cannot transmit information.

Even if, for example, the wireless communication apparatus tries to make a channel allocation request by using a guaranteed time slot, the wireless communication apparatus cannot accurately detect the transmission area allocated thereto to transmit information.

In cases in which transmission is to be performed while the transmission capacity remains the same, re-transmission is not to be performed, and broadcast transmission is to be performed, it is clear that only a predetermined transmission area that is determined from the beginning is necessary. When a transmission channel is dynamically changed by applying dynamic TDMA to transmit data in these cases, an unused transmission channel remains, which is wasteful and inefficient.

SUMMARY OF THE INVENTION

Accordingly, it is an object of the present invention to provide an improved wireless communication system for efficiently allocating a transmission channel used by each wireless communication apparatus in each transmission frame defined by a beacon signal transmitted by a coordinator (wireless control station), a wireless communication control apparatus and method, a wireless communication apparatus and method, and a storage medium.

It is another object of the present invention to provide an improved wireless communication system for efficiently allocating a transmission channel in a transmission frame in response to a channel allocation request made by each wireless communication apparatus toward the coordinator, a wireless communication control apparatus and method, a wireless communication apparatus and method, and a storage medium.

It is a further object of the present invention to provide an improved wireless communication system for efficiently allocating a transmission channel in accordance with characteristics of information to be transmitted when a channel allocation request is made by each wireless communication apparatus, a wireless communication control apparatus and method, a wireless communication apparatus and method, and a storage medium.

According to a first aspect of the present invention, the foregoing objects are achieved through provision of a wireless communication system in a wireless network including a plurality of wireless communication apparatuses, the wireless communication system allocating a transmission channel to each of the wireless communication apparatuses using a transmission frame defined by a beacon signal. The wireless communication system includes a transmission information determining unit for determining characteristics of information to be transmitted, by each of the wireless communication apparatuses, using a channel allocated in response to a channel allocation request from each of the wireless communication apparatuses; and a channel allocation unit for determining the position of a transmission channel, in the transmission frame, to be allocated to the information to be transmitted in accordance with the characteristics of the information to be transmitted.

The word "system" represents a logical set of units or function modules for performing specific functions. Each unit or module is not necessarily included in a single container.

The wireless communication system according to the first aspect of the present invention can be adopted for use in transmission using an allocated channel in a personal area network created by, for example, a wireless LAN. In the wireless communication system according to the first aspect of the present invention, the position of a transmission channel, in a transmission frame, to be allocated to information to be transmitted can be determined in accordance with characteristics of the information to be transmitted. Even if a wireless communication apparatus operating in the wireless communication system cannot obtain channel allocation information transmitted from a control station, the wireless communication apparatus can detect the start position and the end position of a time slot depending on the characteristics of the information to be transmitted. As a result, wireless data transmission/reception can be successfully performed.

The transmission information determining unit may determine whether or not the amount of channel space requested by each of the wireless communication apparatuses to transmit information is constant. The channel allocation unit may allocate, in response to each channel allocation request, transmission using the allocated channel in which the amount of channel space requested by each of the wireless communication apparatuses is constant at a specific position in the transmission frame. More specifically, the channel allocation unit may allocate transmission using the allocated channel in which the amount of channel space requested by each of the wireless communication apparatuses is constant towards the end of the transmission frame.

As a result, in transmission using an allocated channel in which the amount of channel space requested by the wireless communication apparatus is constant, even when the wireless communication apparatus cannot receive channel allocation information from the control station, the wireless communication apparatus can successfully perform wireless data transmission/reception. Also, a transmission channel can be efficiently allocated to transmission using a channel allocated in response to each channel allocation request.

The transmission information determining unit may determine whether or not the transmission rate of the information to be transmitted is variable among transmission frames. The channel allocation unit may allocate, in response to each channel allocation request, transmission using the allocated channel in which the transmission rate is steady among transmission frames at a fixed position in the transmission frame and may allocate transmission using the allocated channel in which the transmission rate is variable at a variable position in the transmission frame. More specifically, the channel allocation unit may allocate transmission using the allocated channel in which the transmission rate is steady towards the end of the transmission frame and may allocate transmission using the allocated channel in which the transmission rate is variable towards the front of the transmission frame.

As a result, in transmission using an allocated channel in which the transmission rate is steady among transmission frames, even when the wireless communication apparatus cannot obtain channel allocation information from the control station, the wireless communication apparatus can successfully perform wireless data transmission/reception. Also, a transmission channel can be efficiently allocated to transmission using a channel allocated in response to each channel allocation request.

According to a second aspect of the present invention, there is provided a wireless communication control apparatus or method in a wireless network including a plurality of wireless communication apparatuses, wherein data transmission is performed by allocating a transmission channel in a transmission frame defined by a beacon signal to each of the wireless communication apparatuses, the wireless communication control apparatus or method processing a channel allocation request from each of the wireless communication apparatuses. The wireless communication control apparatus or method includes a channel allocation request receiving unit or step for receiving the channel allocation request from each of the wireless communication apparatuses, the channel allocation request relating to transmission using a channel allocated in response to the channel allocation request; a transmission information determining unit or step for determining characteristics of information to be transmitted, by each of the wireless communication apparatuses, using the channel allocated in response to the channel allocation request; a channel allocation unit or step for determining the position of a transmission channel, in the transmission frame, to be allocated to the information to be transmitted in accordance with the characteristics of the information to be transmitted; and a channel allocation information transmitting unit or step for transmitting channel allocation information to each of the wireless communication apparatuses that sent the channel allocation request.

The wireless communication control apparatus or method according to the second aspect of the present invention is applicable to a control station for performing transmission channel allocation in a personal area network created by, for example, a wireless LAN.

According to a third aspect of the present invention, there is provided a wireless communication apparatus or method operating on a wireless network including a plurality of wireless communication apparatuses, wherein data transmission is performed by allocating a transmission channel in a transmission frame defined by a beacon signal to each of the wireless communication apparatuses. The wireless communication apparatus or method includes a transmission information determining unit or step for determining characteristics of information to be transmitted; a channel allocation requesting unit or step for making a channel allocation request toward a control station on the wireless network in accordance with the characteristics of the information to be transmitted; a channel allocation information receiving unit or step for receiving channel allocation information from the control station; and an information transmitting unit or step for performing information transmission in accordance with the channel allocation information.

According to a fourth aspect of the present invention, in a wireless network including a plurality of wireless communication apparatuses, wherein data transmission is performed by allocating a transmission channel in a transmission frame defined by a beacon signal to each of the wireless communication apparatuses, there is provided a storage medium having physically stored therein computer software in a computer-readable format for causing a computer system to perform transmission channel allocation based on a channel allocation request from each of the wireless communication apparatuses. The computer software includes a channel allocation request receiving step of receiving the channel allocation request from each of the wireless communication apparatuses, the channel allocation request relating to transmission using a channel allocated in response to the channel allocation request; a transmission information determining step of determining characteristics of information to be transmitted, by each of the wireless communication apparatuses, using the channel allocated in response to the channel allocation request; a channel allocation step of determining the position of a transmission channel, in the transmission frame, to be allocated to the information to be transmitted in accordance with the characteristics of the information to be transmitted; and a channel allocation information transmitting step of transmitting channel allocation information to each of the wireless communication apparatuses that sent the channel allocation request.

According to a fifth aspect of the present invention, there is provided a storage medium having physically stored therein computer software in a computer-readable format for causing a computer system to perform wireless communication processing in a wireless network including a plurality of wireless communication apparatuses, wherein data transmission is performed by allocating a transmission channel in a transmission frame defined by a beacon signal to each of the wireless communication apparatuses. The computer software includes a transmission information determining step of determining characteristics of information to be transmitted; a channel allocation requesting step of making a channel allocation request toward a control station on the wireless network in accordance with the characteristics of the information to be transmitted; a channel allocation information receiving step of receiving channel allocation information from the control station; and an information transmitting step of performing information transmission in accordance with the channel allocation information.

The storage medium according to the fourth and fifth aspects of the present invention is a medium for providing computer software in a computer-readable format to a general computer system capable of performing various program code instructions. Such a medium is a removable and portable storage medium such as a CD (Compact Disc), an FD (Floppy Disc), or an MO (Magneto-Optical Disc). The storage medium can be formed not only by package media but also by a semiconductor memory or a magnetic disk having a program temporarily or permanently stored therein. Also, the computer software can be provided to a specific computer system via a transmission medium such as a network (either wireless or wired).

Such a program storage medium defines the structural or functional cooperation relationship between predetermined computer software and the storage medium for causing a computer system to perform the functions of the computer software. In other words, by installing predetermined computer software into a computer system via the program storage medium according to the fourth and fifth aspects of the present invention, the computer system can perform the cooperative operation. As a result, the operation similar to that of the wireless communication control apparatus or method according to the second aspect of the present invention or the operation similar to that of the wireless communication apparatus or method according to the third aspect of the present invention can be achieved.

As described above, according to the present invention, it is possible to provide an improved wireless communication system for efficiently allocating a transmission channel to be used by each wireless communication apparatus in each transmission frame defined by a beacon signal transmitted by a coordinator (wireless control station), a wireless communication control apparatus and method, a wireless communication apparatus and method, and a storage medium.

According to the present invention, it is possible to provide an improved wireless communication system for efficiently allocating a transmission channel in a transmission frame in response to a channel allocation request made by each wireless communication apparatus toward the coordinator, a wireless communication control apparatus and method, a wireless communication apparatus and method, and a storage medium.

According to the present invention, it is possible to provide an improved wireless communication system for efficiently allocating a transmission channel in accordance with characteristics of information to be transmitted when a channel allocation request is made by each wireless communication apparatus, a wireless communication control apparatus and method, a wireless communication apparatus and method, and a storage medium.

According to the present invention, transmission in which the transmission capacity remains unchanged is allocated towards the end of the transmission frame, and a transmission channel portion using known dynamic TDMA is allocated towards the front of the transmission frame. Thus, in addition to a channel allocation method using known guaranteed time slots and dynamic TDMA, transmission in which the transmission capacity remains unchanged can be allocated to a stable portion in which the transmission channel is steady.

In a wireless network to which the present invention is applied, transmission in which the amount of information to be transmitted is substantially constant and transmission using an allocated channel in which the amount of information to be transmitted dynamically changes can coexist in the same transmission line.

In a wireless network to which the present invention is applied, only the minimum guaranteed channel is allocated to transmission in which the amount of information to be transmitted is constant. Thus, a contention free period (CFP) can be efficiently utilized. Also, an increased redundant channel can be allocated to transmission in which the amount of information to be transmitted is variable.

According to the present invention, by arranging transmission using an allocated channel in which the amount of information to be transmitted is less variable at a specific position in a transmission frame, transmission using an allocated channel in which the amount of information to be transmitted is variable can be efficiently allocated. If it is necessary to allocate a less-variable channel to a plurality of pieces of information to be transmitted, a channel can be allocated at a specific position in a series of transmission frames. Thus, a channel can be efficiently allocated to transmission using an allocated channel in which the amount of information to be transmitted is variable.

According to the present invention, it is possible to allocate the same transmission channel in all frames to areas in which transmission using an allocated channel is performed. When information transmission is continuously performed, processing can be simplified. For example, when a wireless communication terminal fails to obtain a beacon signal transmitted from a control station while performing transmission using an allocated channel, the wireless communication terminal can continue transmitting information using the allocated channel. Accordingly, uninterrupted transmission can be achieved even when moving image information is transmitted for a long period of time.

According to the present invention, by allocating less-variable transmission towards the end of a transmission frame, the boundary between a contention access period (CAP) and a contention free period (CFP) towards the front of the transmission frame can be variably set.

Further objects, features, and advantages of the present invention will become apparent from the following description of the preferred embodiments with reference to the attached drawings.

DESCRIPTION OF THE PREFERRED
EMBODIMENTS

With reference to the accompanying drawings, the present invention will now be described using a case in which the present invention is applied to a wireless network standardized by IEEE 802.15.3.

Figure 1:
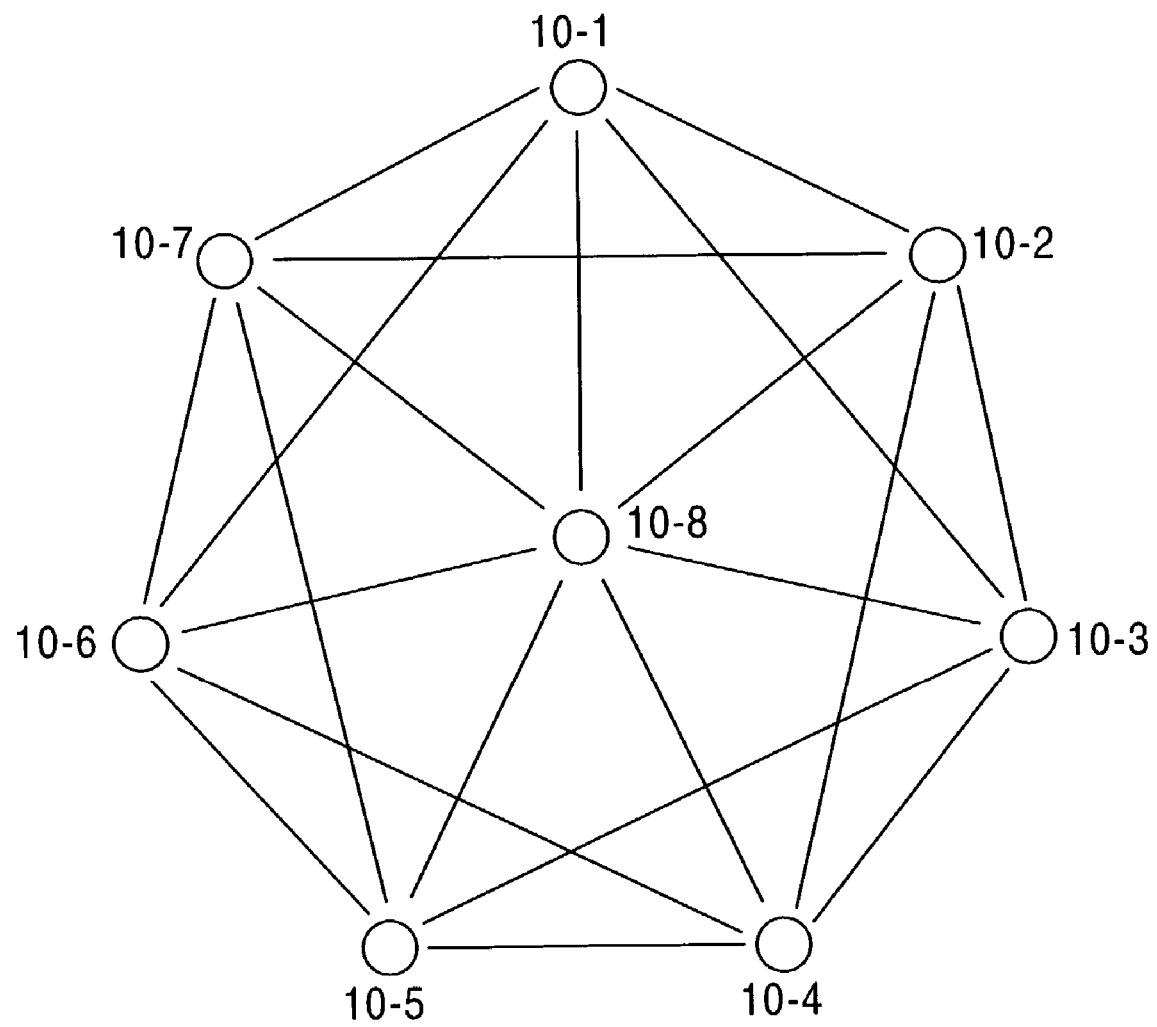
FIG. 1 schematically illustrates the configuration of a wireless network according to an embodiment of the present invention.

FIG. 1 shows the configuration of a wireless network 1 according to an embodiment of the present invention. The wireless network 1 includes a plurality of wireless communication apparatuses 10-1, 10-2, . . . Each of the wireless communication apparatuses 10-1, 10-2, . . . is formed by locally connecting a wireless communication unit having a wireless transmission/reception function to a general computer system such as a PC.

In the wireless network 1 shown in FIG. 1, one wireless communication apparatus 10-8 functions as a coordinator, that is, a control station of the wireless network 1. The rest of the communication apparatuses 10-1 to 10-7 are interconnected via the wireless network 1 under the communication order of the control station 10-8.

The communication apparatus 10-8 is represented to be in a state in which the communication apparatus 10-8 can easily communicate with all the other wireless communication apparatuses 10-1 to 10-7. The communication apparatus 10-8 is at an appropriate position for functioning as the control station.

The wireless communication apparatus 10-1 is located at a position relatively near the wireless communication apparatuses 10-2, 10-7, and 10-8, which means that the communication apparatus 10-1 can easily transmit information to the wireless communication apparatuses 10-2, 10-7, and 10-8. In contrast, since the wireless communication apparatus 10-1 is located at a position relatively far from the wireless communication apparatuses 10-3 and 10-6, information transmission may become more or less difficult. Since the wireless communication apparatus 10-1 is far from the wireless communication apparatuses 10-4 and 10-5, the wireless communication apparatus 10-1 cannot perform wireless communication with the wireless communication apparatuses 10-4 and 10-5.

Similarly, please note that the positional relationships of the other wireless communication apparatuses 10-2 to 10-7 with one another shown in FIG. 1 indicate corresponding communication states.

Figure 2:
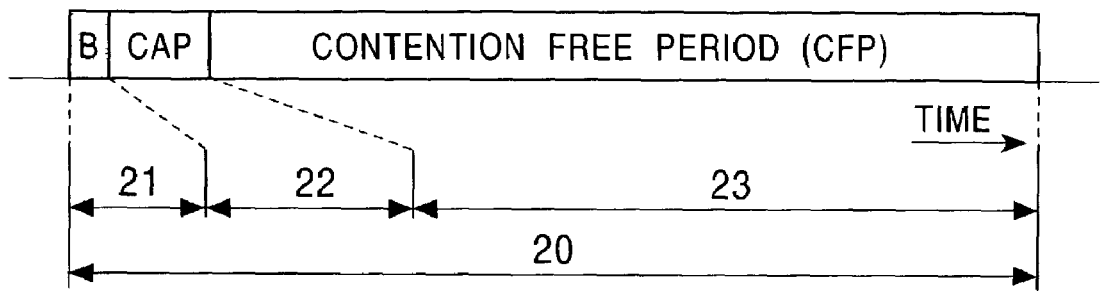
FIG. 2 illustrates an example of a frame structure used in data transmission in the wireless network according to the embodiment.

FIG. 2 shows an example of a frame structure used in data transmission in the wireless network 1 according to the embodiment.

Referring to FIG. 2, a transmission frame 20 includes a beacon broadcast area (B) 21 at the beginning of the frame in which a beacon is broadcast by the control station (wireless communication apparatus 10-8) over the wireless network 1; a contention access period (CAP) 22 in which processing when each wireless communication apparatus 10-1 . . . enters the wireless network 1 is performed or in which short asynchronous information or a command is exchanged; and a contention free period (CFP) 23 in which each wireless communication apparatus 10-1 . . . requests a channel to be allocated and transmits information. One transmission frame 20 ranges from the beginning of the beacon broadcast area (B) 21 to the next beacon broadcast area. The length of a transmission frame may be constant or variable from one transmission frame to another.

The structure of the transmission frame 20 is described in beacon information which is broadcast over the wireless network 1 at the beginning of the frame.

According to the specification standardized by IEEE 802.15.3, in the CFP 23, transmission using an allocated channel by using a guaranteed time slot (GTS) is performed in accordance with a multiplex transmission method, referred to as dynamic TDMA. Accordingly, information can be transmitted directly from one arbitrary wireless communication apparatus to another in the wireless network 1.

Figure 3:
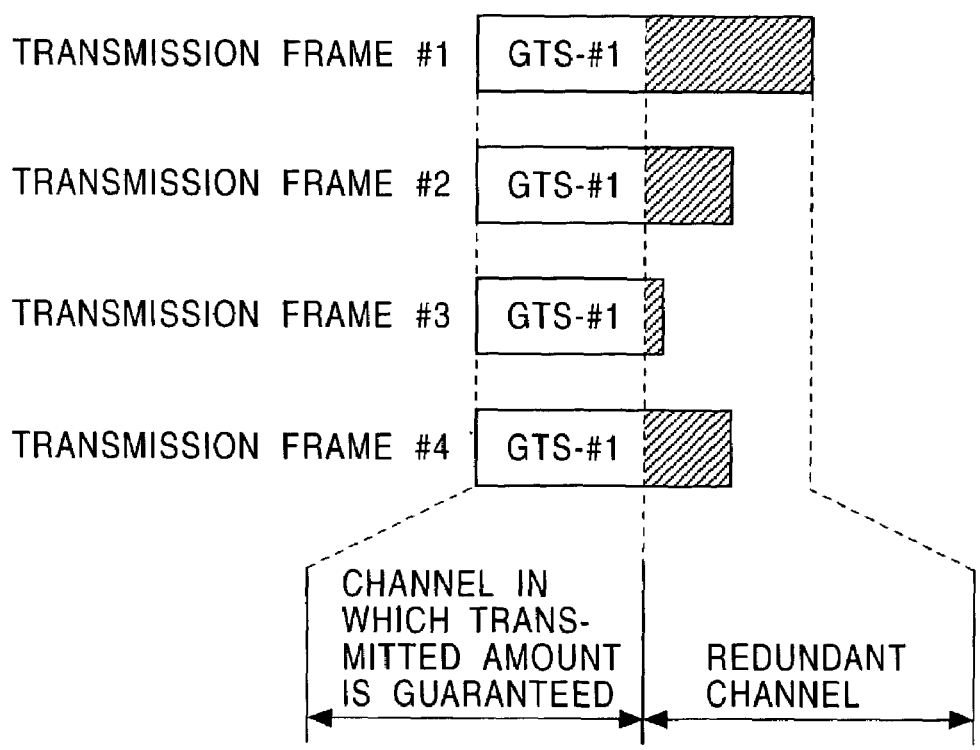
FIG. 3 schematically illustrates the configuration of a guaranteed time slot (GTS) as a channel allocation method to be standardized by IEEE 802.15.3.

FIG. 3 shows the configuration of a guaranteed time slot (GTS) as a channel allocation method standardized by IEEE 802.15.3.

Referring to FIG. 3, one guaranteed time slot to be allocated is variable from one transmission frame to another. The guaranteed time slot consists of an area guaranteed to perform minimum transmission and a redundant area for assisting transmission in the guaranteed area. A redundant channel to be added is variable depending on the circumstances of a transmission channel.

When a transmission error occurs, the redundant channel may be used to perform re-transmission processing. According to the specification standardized by IEEE 802.15.3, the amount of channel space to be allocated may be variable from one transmission frame to another.

Figure 4:
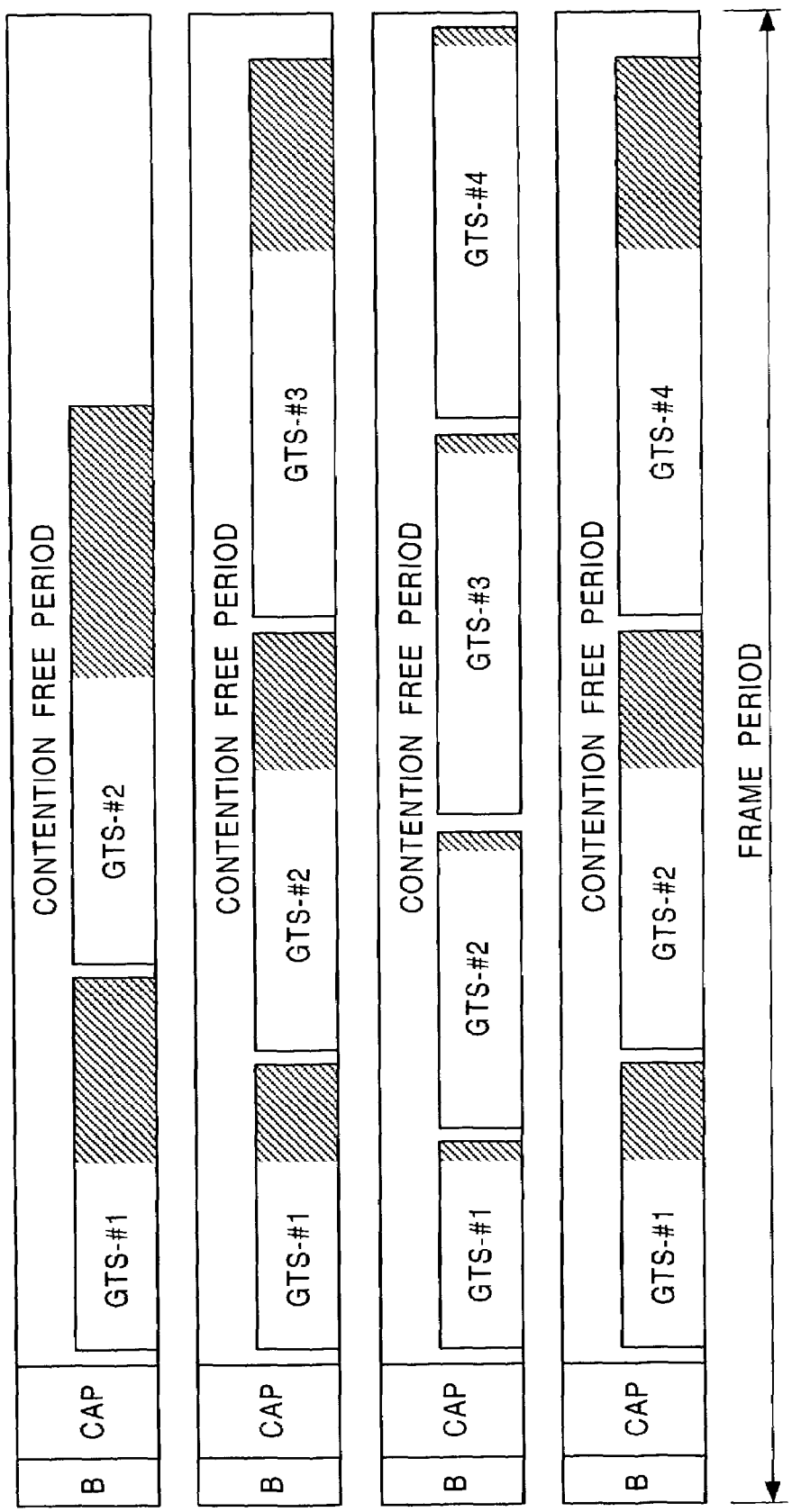
FIG. 4 illustrates a known case in which a transmission channel is allocated using dynamic TDMA.

FIG. 4 shows a case in which a transmission channel is allocated using dynamic TDMA in accordance with a known method.

Referring to FIG. 4, the first transmission frame from the top has a frame period set to a predetermined period. A CFP includes two guaranteed time slots, namely, GTS-#1 and GTS-#2.

In this case, the first transmission frame has a sufficient transmission channel (CFP). Each guaranteed time slot is allocated to include a redundant area (shaded portion in FIG. 4) of approximately the same size as a portion in which a channel is guaranteed.

Referring to FIG. 4, the second transmission frame from the top has a frame period set to a predetermined period. A CFP has three guaranteed time slots.

In this case, the second transmission frame does not have a sufficient transmission channel. Each guaranteed time slot is allocated to include a redundant area (shaded portion in FIG. 4) smaller than a portion in which a channel is guaranteed.

Referring to FIG. 4, the third transmission frame from the top has a frame period set to a predetermined period. A CFP has four guaranteed time slots.

In this case, the third transmission frame has a less sufficient transmission channel. Each guaranteed time slot is allocated to barely include a redundant area (shaded portion in FIG. 4) in a portion in which a channel is guaranteed.

Referring to FIG. 4, the fourth transmission frame from the top has a frame period set to a predetermined period. A CFP has three guaranteed time slots, which is fewer than that of the third transmission frame.

In this case, the fourth transmission frame has a more sufficient transmission channel. Each guaranteed time slot is allocated to include an increased redundant area (shaded portion in FIG. 4) in addition to a portion in which a channel is guaranteed.

In other words, according to the known channel allocation method using dynamic TDMA, the amount of channel space allocated to each guaranteed time slot changes from one frame period to another. If each wireless communication apparatus 10-1 . . . cannot obtain channel allocation information transmitted from the wireless communication apparatus 10-8, which is the control station, at the beginning of a frame, each wireless communication apparatus 10-1 . . . cannot detect the start position and the end position of a guaranteed time slot. As a result, each wireless communication apparatus 10-1 . . . cannot correctly perform communication.

Figure 5:
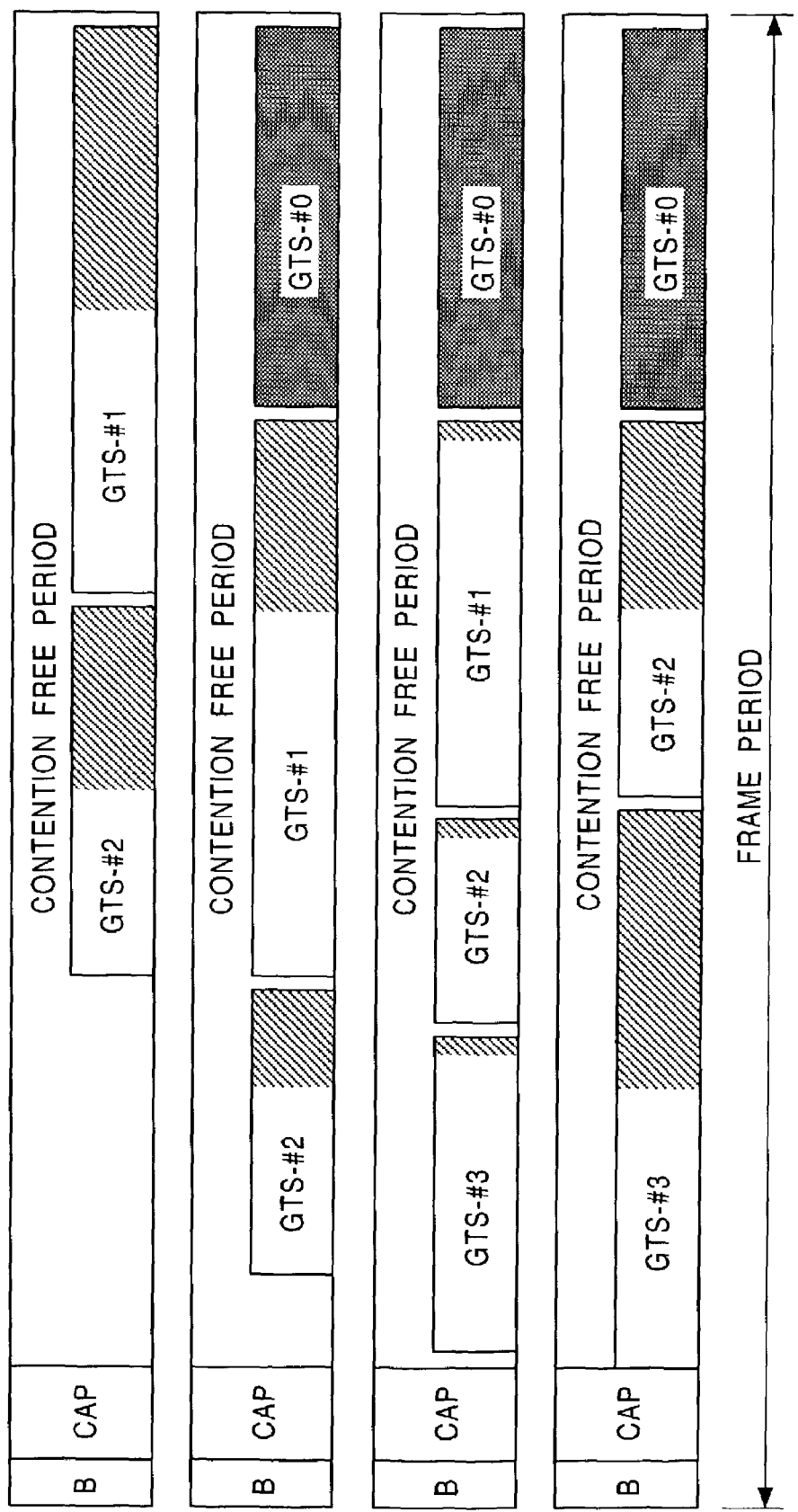
FIG. 5 illustrates a case in which a transmission channel is allocated using dynamic TDMA according to the present invention.

FIG. 5 shows a case in which a transmission channel is allocated using dynamic TDMA according to the present invention.

Referring to FIG. 5, the first transmission frame from the top has a frame period set to a predetermined period. A CFP includes two guaranteed time slots.

Since the first transmission frame has a sufficient transmission channel, each guaranteed time slot is allocated to include a redundant area (shaded portion in FIG. 5) of approximately the same size as that of a portion in which a channel is guaranteed.

Referring to FIG. 5, the second transmission frame from the top has a frame period set to a predetermined period. A CFP has three guaranteed time slots.

Since the second transmission frame has a less sufficient transmission channel, each guaranteed time slot is allocated to include a redundant area (shaded portion in FIG. 5) smaller than a portion in which a channel is guaranteed.

For transmission that requires no redundant area other than an area in which a channel is guaranteed, that is, for transmission using an allocated channel in which the amount of channel space to be allocated remains constant, such as when information is transmitted at a fixed transmission rate, a guaranteed time slot #0 is allocated at the end of a transmission frame.

Referring to FIG. 5, the third transmission frame from the top has a frame period set to a predetermined period. A CFP has four guaranteed time slots.

Since the third transmission frame has a further less sufficient transmission channel, each guaranteed time slot is allocated to barely include a redundant area in a portion in which a channel is guaranteed.

The guaranteed time slot GTS #0 does not need a redundant area. In other words, the amount of channel space to be allocated remains constant. Accordingly, the guaranteed time slot GTS #0 is fixedly allocated without changing the amount of channel space to be allocated.

Referring to FIG. 5, the fourth transmission frame from the top has a frame period set to a predetermined period. A CFP has three guaranteed time slots, which is fewer than that of the third transmission frame.

Since the fourth transmission frame has a more sufficient transmission channel, each guaranteed time slot has an increased redundant area in addition to a portion in which a channel is guaranteed.

The guaranteed time slot GTS #0 does not need a redundant area. In other words, the amount of channel space to be allocated remains constant. Accordingly, the guaranteed time slot GTS #0 is fixedly allocated without changing the amount of channel space to be allocated.

In this embodiment, channel allocation is performed in which the amount of channel space to be allocated to each guaranteed time slot remains constant in each frame period. For transmission of information, such a transmission channel is allocated to a predetermined portion of a frame period.

In such a case, even if each wireless communication apparatus 10-1 . . . cannot obtain channel allocation information transmitted from the wireless communication apparatus 10-8 functioning as the control station, each wireless communication apparatuses 10-1 . . . other than the wireless communication apparatus 10-8 can detect the start position and the end position of a fixedly allocated guaranteed time slot.

Even when a transmission channel is dynamically changed by adopting dynamic TDMA to transmission data, the amount of channel space not to be used for transmission is reduced in a transmission frame. Thus, the transmission efficiency can be improved. Although FIG. 5 shows a case in which the frame period is fixed, the frame period may vary from one frame to another.

Figure 6:
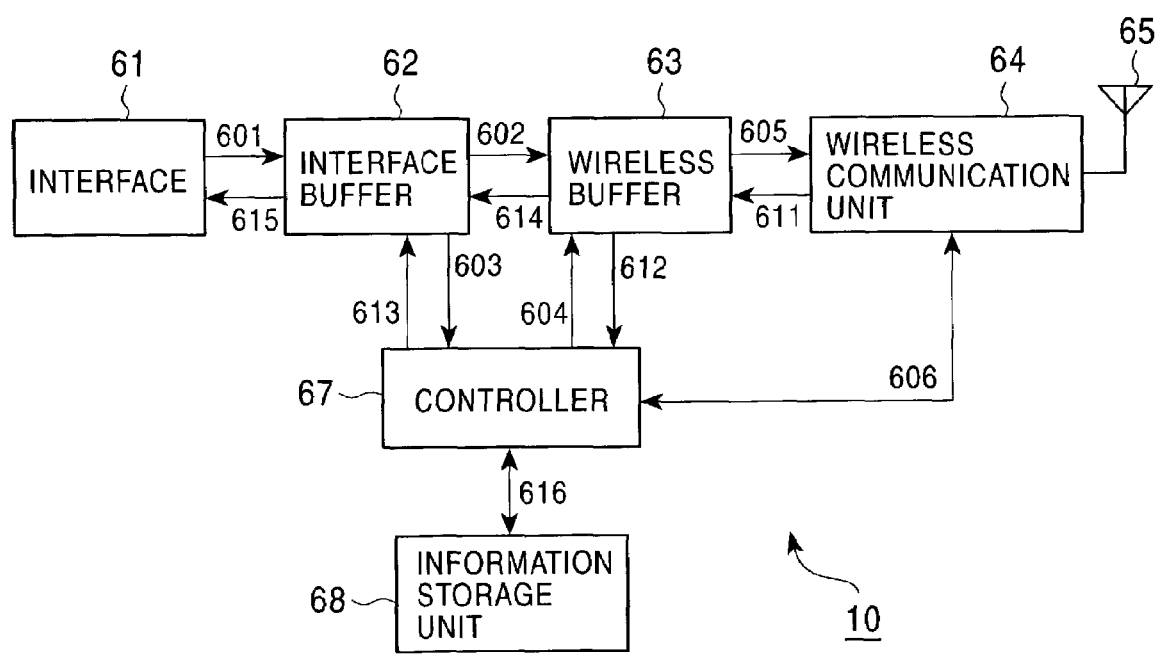
FIG. 6 is a block diagram of the configuration of a wireless communication apparatus operable in the wireless network according to the embodiment.

FIG. 6 shows the configuration of a wireless communication apparatus 10 operable on the wireless network according to the embodiment. As shown in FIG. 6, the wireless communication apparatus 10 includes an interface 61, an interface buffer 62, a wireless buffer 63, a wireless communication unit 64, an antenna 65, a controller 67, and an information storage unit 68.

The interface 61 connects to an external apparatus such as a PC. The interface buffer 62 stores media information 601 supplied from the external apparatus. The wireless buffer 63 stores wireless transmission information 602 transmitted from the interface buffer 62 as a wireless transmission packet.

The controller 67 controls the overall data transmission processing in the wireless communication apparatus 10. In other words, if it is necessary to transmit information using an allocated channel in response to a wireless transmission notice 603, the controller 67 stores a channel allocation request 604 in the wireless buffer 63 for wireless transmission and transmits the necessary information to the control station 10-8 using a CFP in a transmission frame.

The controller 67 includes a function for determining the type of information to be transmitted. If it is determined that the amount of information to be transmitted remains unchanged, the controller 67 outputs a request in accordance with the determination. In other words, a transmission channel allocation request 605 is wirelessly transmitted from the antenna 65 via the wireless communication unit 64. In practice, the controller 67 is a microprocessor and operates in accordance with a control program stored in a semiconductor memory such as an EEPROM (Electrically Erasable and Programmable Read Only Memory) (not shown).

A signal received by the wireless communication apparatus 10 is supplied via the antenna 65 to the wireless communication unit 64 and transmitted as a decoded signal 611 to the wireless buffer 63.

If the wireless communication apparatus 10 operating as the control station 10-8 receives a signal from each of the other wireless communication apparatuses 10-1 . . . forming the wireless network 1, the signal is supplied as a control signal 612 to the controller 67, and the type of channel allocation required in a transmission frame is determined. The controller 67 forms channel allocation information based on the determination as a beacon signal and wirelessly transmits the beacon signal at the beginning of the frame period. In other words, the beacon signal 605 in that transmission frame is wirelessly transmitted from the antenna 65 via the wireless communication unit 64.

If the wireless communication apparatus 10 operating as an apparatus other than the control station 10-8 receives beacon information transmitted on a substantially periodical basis from the control station 10-8, the wireless communication apparatus 10 supplies the received beacon information to the controller 67. The controller 67 determines corresponding channel allocation information in a CFP described in the beacon information, sets the wireless communication unit 64 in accordance with an instruction described therein, and transmits a wireless transmission packet stored in the wireless buffer 63.

When reception using a CFP is specified in the beacon information, the controller 67 sets the wireless communication unit 64 in accordance with an instruction described therein and receives a signal at a predetermined time.

Information 611 received via the antenna 65 and the wireless communication unit 64 is temporarily stored in the wireless buffer 63. Information 614 received in frame period units in accordance with a frame period signal 604 supplied from the controller 67 is reconstructed, and the reconstructed information 614 is transferred to the interface buffer 62. The information 614 is transferred as information 615 in a predetermined interface format via the interface 61 to an external apparatus (not shown).

The above-described series of operations in the wireless communication apparatus 10 is executed in accordance with instructions from the controller 67. The controller 67 is equipped with the information storage unit 68 for storing various transmission control programs and control information. A command group 616 is defined between the controller 67 and the information storage unit 68 so that the controller 67 can refer to these pieces of information from time to time.

Figure 7:
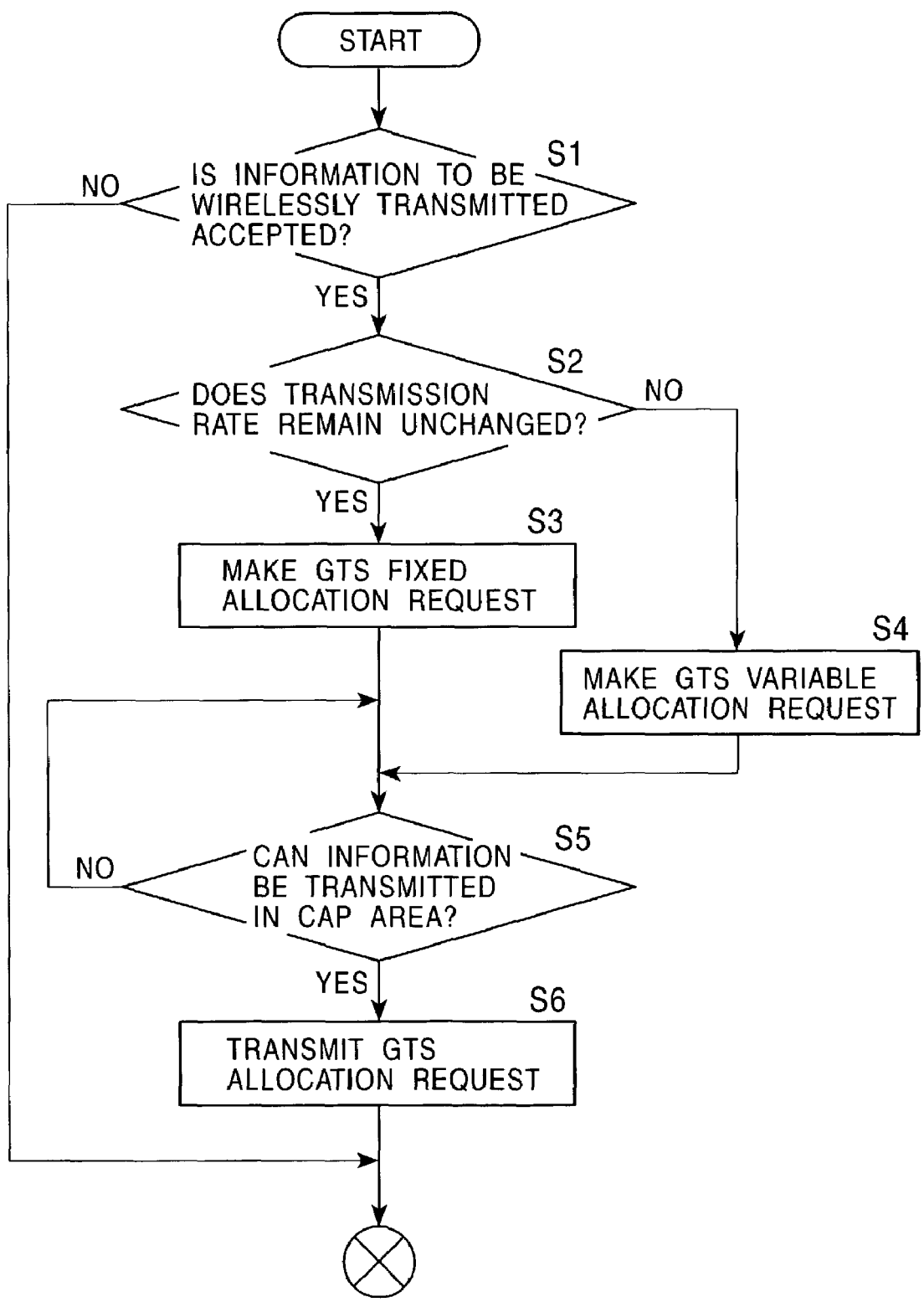
FIG. 7 is a flowchart showing a process of making, by each of wireless communication apparatuses in the wireless network, a channel allocation request to a control station.

FIG. 7 is a flowchart showing a process of making, by each wireless communication apparatus 10-1 . . . in the wireless network 1, a channel allocation request to the control station 10-8. In practice, this process is performed by executing, by the controller 67, a predetermined transmission control program. The channel allocation requesting process will now be described with reference to the flowchart shown in FIG. 7.

It is determined whether or not information that needs to be wirelessly transmitted is accepted by the interface 61 (step S1). If no such information is accepted, the entire process routine is terminated.

In contrast, if information that needs to be wirelessly transmitted is accepted, it is then determined whether or not a transmission rate remains unchanged (step S2). Specifically, whether or not the transmission rate remains unchanged can be determined by, for example, determining whether or not the amount of information to be transmitted remains unchanged (wherein the transmitted amount is part of characteristics of information to be transmitted). Whether or not the transmission rate remains unchanged can be determined by determining whether or not it is necessary to perform re-transmission processing. Also, whether or not the transmission rate remains unchanged can be determined on the basis of the circumstances. For example, if only a few terminals are connected to the wireless network 1, a redundant transmission channel can be allowed.

If the transmission rate remains unchanged, the process makes a guaranteed time slot fixed channel allocation request (step S3) and proceeds to the subsequent step S5.

If the transmission rate is changed, the process makes a guaranteed time slot variable channel allocation request (step S4) and proceeds to the subsequent step S5.

In step S5, it is determined whether or not a CAP is reached and whether or not information can be transmitted (step S5).

If the determination in step S5 is negative, the process is queued in step S5 until the determination becomes affirmative, that is, a CAP is reached and information can be transmitted.

If the determination in step S5 is affirmative, that is, if a CAP transmission area is reached and information can be transmitted, the process transmits a guaranteed time slot (transmission channel) allocation request to the control station 10-8 (step S6).

Figure 8:
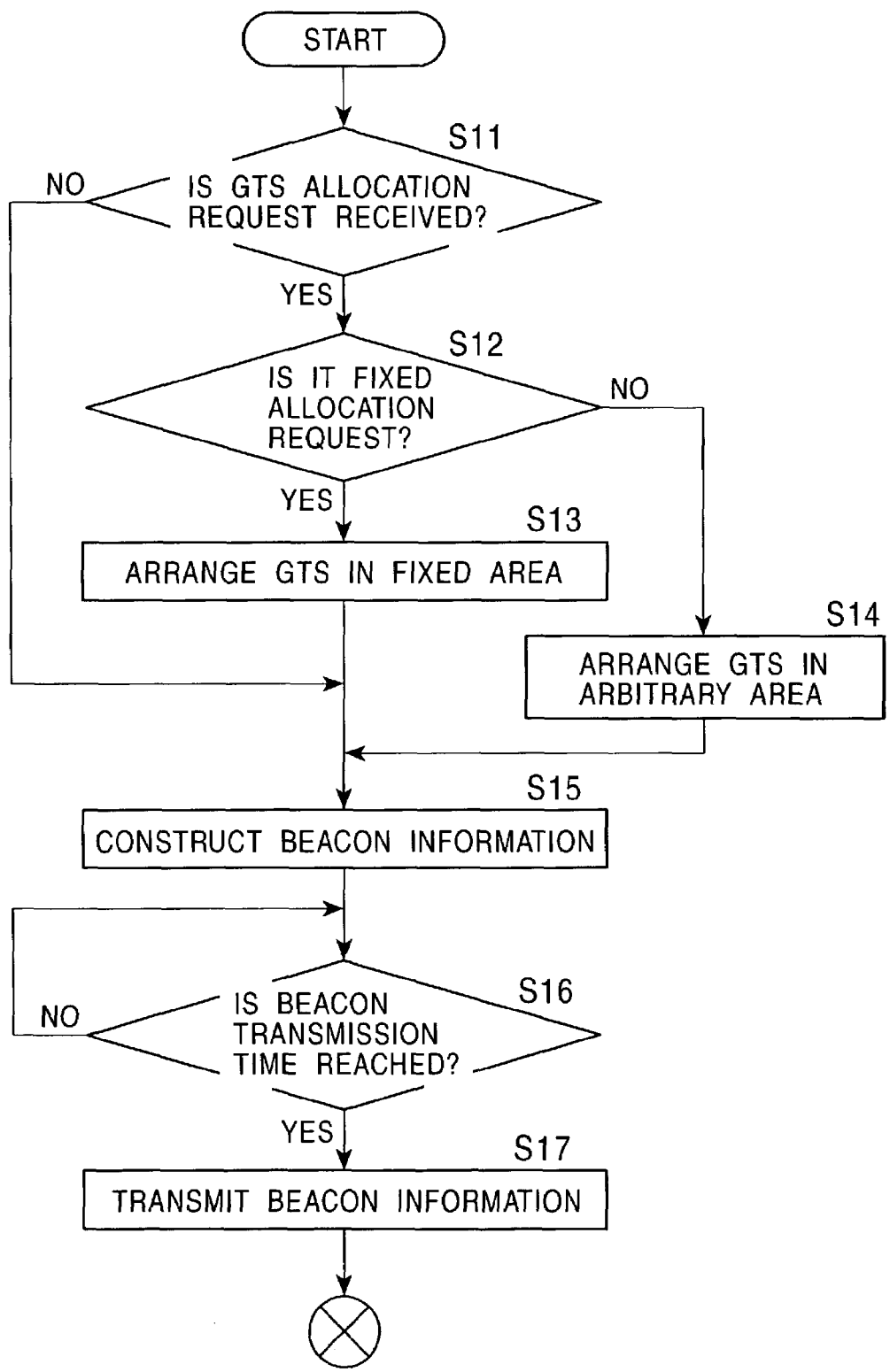
FIG. 8 is a flowchart showing a process of allocating, by a wireless communication apparatus operating as the control station in the wireless network, a transmission channel in response to a transmission channel allocation request from each of the other wireless communication apparatuses.

FIG. 8 is a flowchart showing a process of allocating, by the wireless communication apparatus 10-8 operating as the control station in the wireless network 1, a transmission channel in response to a transmission channel allocation request from each of the other wireless communication apparatuses 10-1 . . . In practice, this process is performed by executing, by the controller 67, a predetermined transmission control program. The channel allocation process will now be described with reference to the flowchart shown in FIG. 8.

It is determined whether or not a guaranteed time slot channel allocation request is received from each wireless communication apparatus 10-1 . . . in the wireless network 1 (step S11).

If no channel allocation request is received, in step S15, beacon information in the corresponding transmission frame is constructed. In contrast, if a channel allocation request is received, it is determined whether or not the request is a fixed allocation request (step S12).

If the request is a fixed allocation request, in step S13, a guaranteed time slot in response to the request is arranged in a fixed area, and beacon information is constructed (step S15). In contrast, if the request is not a fixed allocation request, a guaranteed time slot in response to the request is arranged in an arbitrary area (step S14), and beacon information is constructed (step S15).

After the beacon information is constructed, in step S16, the process is queued until a beacon-information transmission time is reached. If the transmission time is reached, the beacon information in the transmission frame is broadcast to the entire wireless network 1 (step S17).

Figure 9:
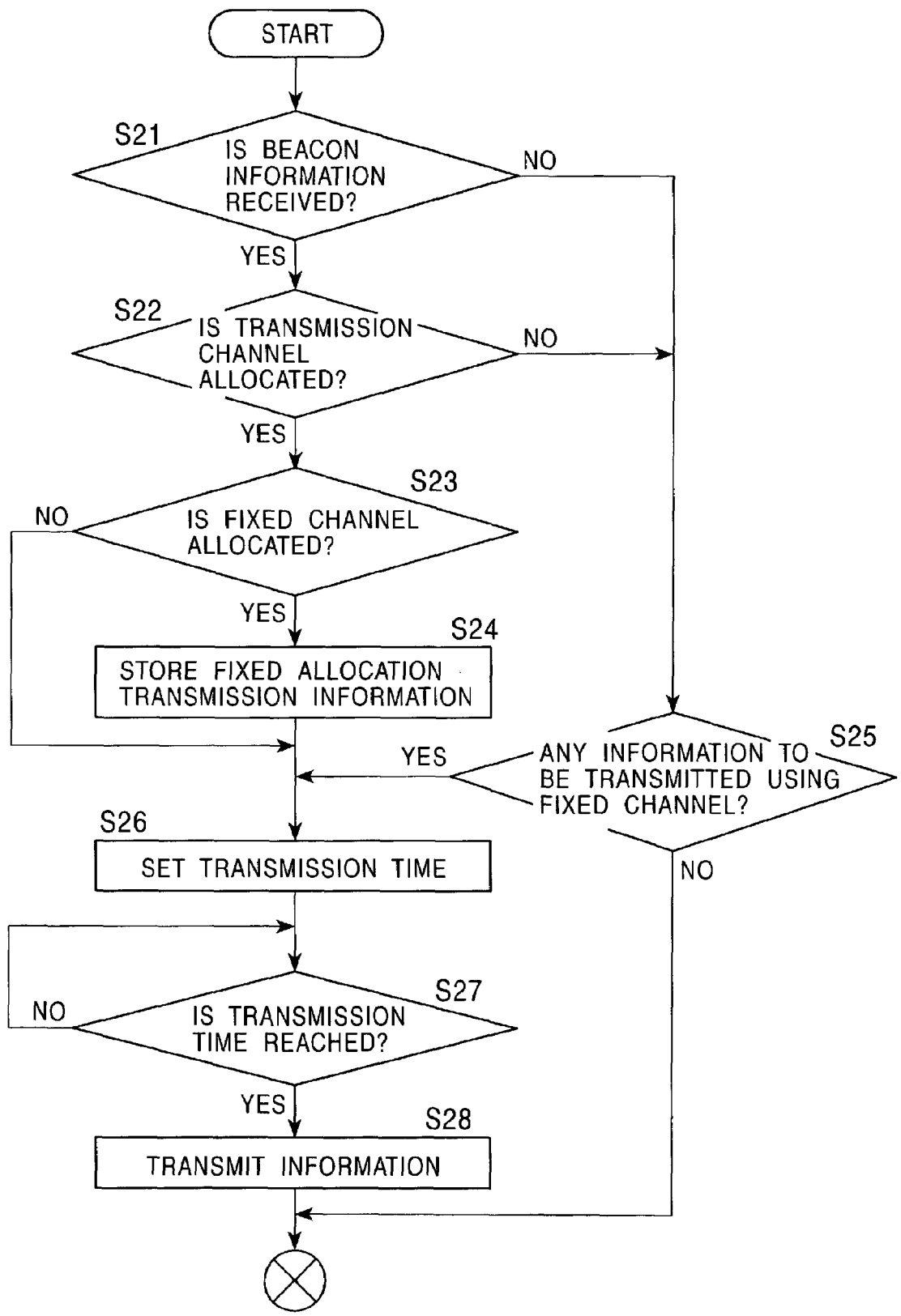
FIG. 9 is a flowchart showing a process of performing wireless transmission by each wireless communication apparatus to which a transmission channel is allocated by the control station in the wireless network.

FIG. 9 is a flowchart showing a process of performing wireless transmission by each wireless communication apparatus 10-1 . . . to which a transmission channel is allocated by the control station in the wireless network 1. In practice, this process is performed by executing, by the controller 67, a predetermined transmission control program. The information transmission process will now be described with reference to the flowchart shown in FIG. 9.

It is determined whether or not beacon information is received from the wireless communication apparatus 10-8, that is, the control station of the wireless network 1 (step S21).

If beacon information is received, it is determined whether or not a channel to be used to transmit information is allocated to the wireless communication apparatus 10-1 . . . (step S22). In this case, a transmission channel allocated to the wireless communication apparatus 10-1 . . . includes both "fixed allocation" and "variable allocation".

If a channel is allocated to the wireless communication apparatus 10-1 . . . to transmit information, the type of channel allocation is detected, that is, it is determined whether or not a fixed channel is allocated (step S23). If a fixed channel is allocated (G75 fixed area), the wireless communication apparatus 10-1 . . . stores fixed allocation transmission information (step S24) and proceeds to step S26.

In contrast, if no beacon information is received in step S21, or if no transmission channel is allocated to the wireless communication apparatus 10-1 . . . in step S22, in step S25, the wireless communication apparatus 10-1 . . . refers to the fixed channel allocation transmission information stored in a register in step S24. If there is information to be transmitted using a fixed channel, the wireless communication apparatus 10-1 . . . proceeds to step S26. If not, the entire process routine is terminated.

In step S26, the corresponding transmission time is set. In step S27, the process is queued until the transmission time is reached. If the transmission time is reached, the corresponding information is transmitted (step S28).

Figure 10:
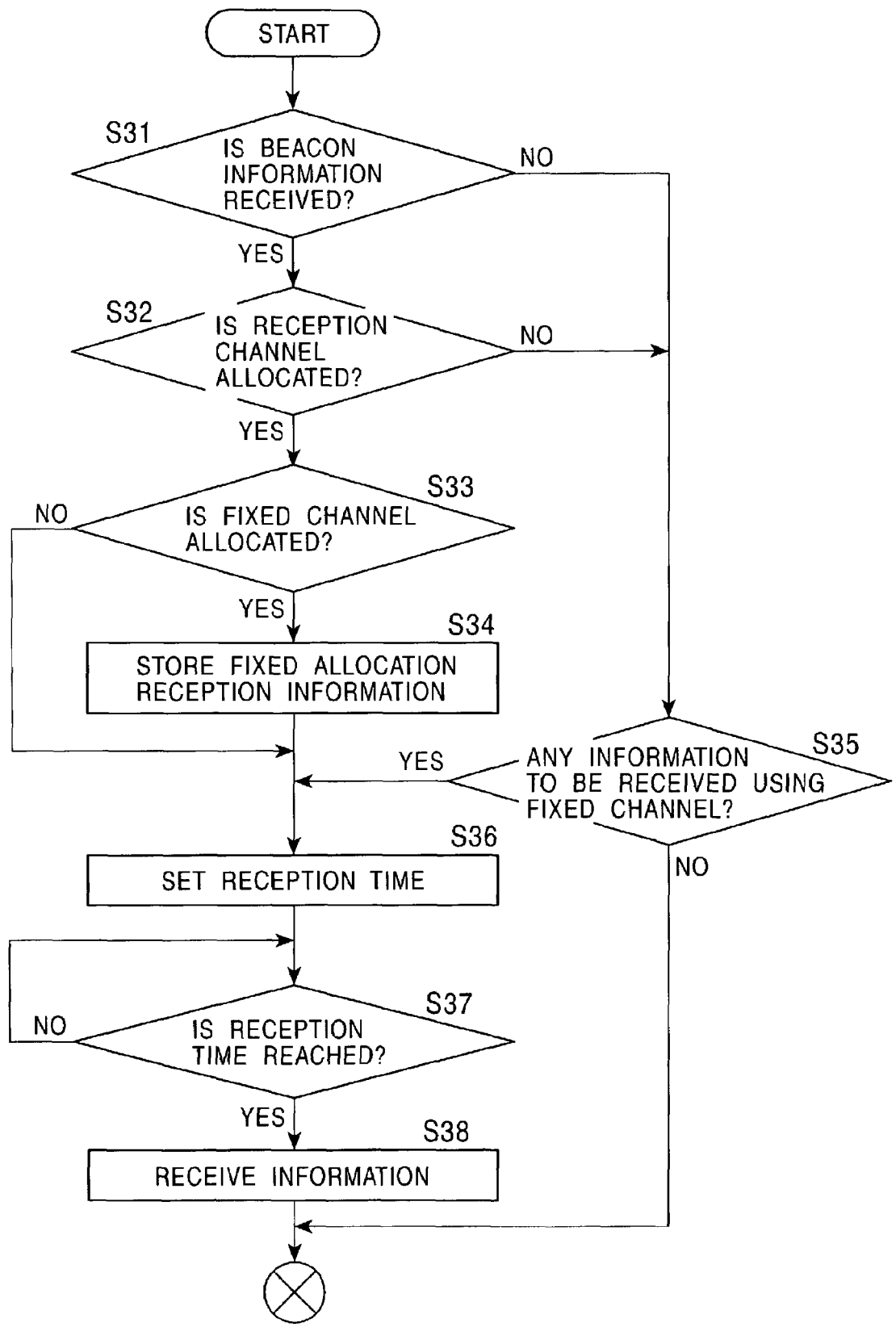
FIG. 10 is a flowchart showing a process of receiving, by each wireless communication apparatus in the wireless network, data transmitted wirelessly by another wireless communication apparatus.

FIG. 10 is a flowchart showing a process of receiving, by each wireless communication apparatus 10-1 . . . , wireless data transmitted from another wireless communication apparatus in the wireless network 1. In practice, this process is performed by executing, by the controller 67, a predetermined transmission control program. The information reception process will now be described with reference to the flowchart shown in FIG. 10.

It is determined whether or not beacon information is received from the wireless communication apparatus 10-8, that is, the control station of the wireless network 1 (step S31).

If beacon information is received, it is determined whether or not a channel to be used to receive information is allocated to the wireless communication apparatus 10-1 . . . (step S32). In this case, a reception channel allocated to the wireless communication apparatus 10-1 . . . includes both "fixed allocation" and "variable allocation".

If a reception channel is allocated to the wireless communication apparatus 10-1 . . . , the type of channel allocation is detected, that is, it is determined whether or not a fixed channel is allocated (step S33). If a fixed channel is allocated, the wireless communication apparatus 10-1 . . . stores fixed allocation reception information (step S34) and proceeds to step S36.

In contrast, in no beacon information is received in step S31, or if no reception channel is allocated to the wireless communication apparatus 10-1 . . . in step S32, in step S35, the wireless communication apparatus 10-1 . . . refers to the fixed allocation reception information stored in a register in step S34. If there is information to be received using a fixed channel, the wireless communication apparatus 10-1 . . . proceeds to step S36. If not, the entire process routine is terminated.

In step S36, the corresponding reception time is set. In step S37, the process is queued until the reception time is reached. If the reception time is reached, the corresponding information is received (step S38).

Although the present invention has been described with reference to the specific examples, it should be understood by those skilled in the art that the present invention is not limited to the embodiments and that various changes and modifications may be made in the invention without departing from the spirit and scope thereof.

In the foregoing embodiments of the present invention, the microprocessor forming the controller 67 controls the components in accordance with a control program permanently stored in a memory such as an EEPROM. However, the present invention is not limited to these embodiments. For example, a program storage medium having a control program stored therein is dynamically installed into an apparatus, and the components can thus be controlled.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A wireless communication control apparatus in a wireless network including a plurality of wireless communication apparatuses, wherein data transmission is performed by allocating a transmission channel in a transmission frame defined by a beacon signal to each of the plurality of wireless communication apparatuses, the wireless communication control apparatus processing a channel allocation request from each of the plurality of wireless communication apparatuses, the wireless communication control apparatus comprising:

- channel allocation request receiving means for receiving the channel allocation request from each of the plurality of wireless communication apparatuses, the channel allocation request relating to transmission using a channel allocated in response to the channel allocation request;
- transmission information determining means for determining characteristics of information to be transmitted, by each of the wireless communication apparatuses using the channel allocated in response to the channel allocation request;
- channel allocation means for determining a position of a transmission channel in the transmission frame to be allocated to the information to be transmitted in accordance with determined characteristics of the information to be transmitted;
- channel allocation information transmitting means for transmitting channel allocation information to each of the plurality of wireless communication apparatuses that sent the channel allocation request;
- wherein the transmission information determining means determines whether an amount of channel space requested by each of the plurality of wireless communication apparatuses to transmit information is constant, and
- the channel allocation means allocates in response to each channel allocation request transmission using the allocated channel in which the amount of channel space requested by each of the wireless communication apparatuses is constant and is allocated from a position towards an end of the transmission frame;
- wherein the allocated channel corresponds to a guaranteed time slot having a guaranteed transmission area followed by a redundant area.

2. A wireless communication control apparatus in a wireless network including a plurality of wireless communication apparatuses, wherein data transmission is performed by allocating a transmission channel in a transmission frame defined by a beacon signal to each of the plurality of wireless communication apparatuses, the wireless communication control apparatus processing a channel allocation request from each of the plurality of wireless communication apparatuses, the wireless communication control apparatus comprising:

- channel allocation request receiving means for receiving the channel allocation request from each of the plurality of wireless communication apparatuses, the channel allocation request relating to transmission using a channel allocated in response to the channel allocation request;
- transmission information determining means for determining characteristics of information to be transmitted, by each of the wireless communication apparatuses using the channel allocated in response to the channel allocation request;
- channel allocation means for determining a position of a transmission channel in the transmission frame to be allocated to the information to be transmitted in accordance with determined characteristics of the information to be transmitted;
- channel allocation information transmitting means for transmitting channel allocation information to each of the plurality of wireless communication apparatuses that sent the channel allocation request;
- wherein the transmission information determining means determines whether a transmission rate of the information to be transmitted is variable among transmission frames, and
- the channel allocation means allocates in response to each channel allocation request transmission using the allocated channel in which the transmission rate is steady among transmission frames at a fixed position in the transmission frame and allocates transmission using the allocated channel in which the transmission rate is variable and is allocated from a position towards a front of the transmission frames;
- wherein the allocated channel corresponds to a guaranteed time slot having a guaranteed transmission area followed by a redundant area.

3. A storage medium having physically stored therein computer software in a computer-readable format, in a wireless network including a plurality of wireless communication apparatuses, wherein data transmission is performed by allocating a transmission channel in a transmission frame defined by a beacon signal to each of the plurality of wireless communication apparatuses, the computer software causing a computer system to perform transmission channel allocation based on a channel allocation request from each of the wireless communication apparatuses, the computer software comprising:

- a channel allocation request receiving step of receiving the channel allocation request from each of the plurality of wireless communication apparatuses, the channel allocation request relating to transmission using a channel allocated in response to the channel allocation request;
- a transmission information determining step of determining characteristics of information to be transmitted, by each of the plurality of wireless communication apparatuses using the channel allocated in response to the channel allocation request;
- a channel allocation step of determining a position of a transmission channel in the transmission frame to be allocated to determined information to be transmitted in accordance with the characteristics of the information to be transmitted;
- a channel allocation information transmitting step of transmitting channel allocation information to each of the plurality of wireless communication apparatuses that sent the channel allocation request;
- wherein the transmission information determining step determines whether an amount of channel space requested by each of the plurality of wireless communication apparatuses to transmit information is constant, and
- in the channel allocation step in response to each channel allocation request transmission using the allocated channel in which the amount of channel space requested by each of the wireless communication apparatuses is constant is allocated from a position towards an end of the transmission frame;
- wherein the allocated channel corresponds to a guaranteed time slot having a guaranteed transmission area followed by a redundant area.

4. A storage medium having physically stored therein computer software in a computer-readable format, in a wireless network including a plurality of wireless communication apparatuses, wherein data transmission is performed by allocating a transmission channel in a transmission frame defined by a beacon signal to each of the plurality of wireless communication apparatuses, the computer software causing a computer system to perform transmission channel allocation based on a channel. allocation request from each of the wireless communication apparatuses, the computer software comprising:

a channel allocation request receiving step of receiving the channel allocation request from each of the plurality of wireless communication apparatuses, the channel allocation request relating to transmission using a channel allocated in response to the channel allocation request;

a transmission information determining step of determining characteristics of information to be transmitted, by each of the plurality of wireless communication apparatuses using the channel allocated in response to the channel allocation request;

a channel allocation step of determining a position of a transmission channel in the transmission frame to be allocated to determined information to be transmitted in accordance with the characteristics of the information to be transmitted;

a channel allocation information transmitting step of transmitting channel allocation information to each of the plurality of wireless communication apparatuses that sent the channel allocation request;

wherein the transmission information determining step determines whether a transmission rate of the information to be transmitted is variable among transmission frames, and in the channel allocation step in response to each channel allocation request transmission using the allocated channel in which the transmission rate is steady is allocated towards an end of the transmission frame, and transmission using the allocated channel in which the transmission rate is variable is allocated from a position towards a front of the transmission frames;

wherein the allocated channel corresponds to a guaranteed time slot having a guaranteed transmission area followed by a redundant area.

* * * * *

UNITED STATES PATENT AND TRADEMARK OFFICE
CERTIFICATE OF CORRECTION

PATENT NO.         : 7,313,153 B2                                     Page 1 of 1
APPLICATION NO.    : 10/209995
DATED              : December 25, 2007
INVENTOR(S)        : Shigeru Sugaya It is certified that error appears in the above-identified patent and that said Letters Patent is hereby corrected as shown below:

Column 15, line 11, "transmitted," should read --transmitted--;

Column 15, line 55, "transmitted," should read --transmitted--;

Column 16, line 12, "frames" should read --frame--;

Column 16, line 34, "transmitted," should read --transmitted--;

Column 16, line 40, "determined" should read --determine--;

Column 16, line 62, "format," should read --format--;

Column 17, line 2, "channel." should read --channel--;

Column 17, line 12, "transmitted," should read --transmitted--;

Column 17, line 18, "determined" should read --determine--;

Column 18, line 15, "frames" should read --frame--.

Signed and Sealed this

Tenth Day of March, 2009

JOHN DOLL
*Acting Director of the United States Patent and Trademark Office*